(12) United States Patent
Huang et al.

(10) Patent No.: US 9,348,361 B2
(45) Date of Patent: May 24, 2016

(54) PORTABLE INTERACTIVE ELECTRONIC APPARATUS

(71) Applicant: PixArt Imaging Inc., Hsin-Chu (TW)

(72) Inventors: Yu-Hao Huang, Hsin-Chu (TW);
Ming-Tsan Kao, Hsin-Chu (TW);
Yung-Chang Lin, Hsin-Chu (TW);
Hui-Hsuan Chen, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 113 days.

(21) Appl. No.: 13/870,958

(22) Filed: Apr. 25, 2013

(65) Prior Publication Data

US 2014/0160023 A1    Jun. 12, 2014

(30) Foreign Application Priority Data

Dec. 6, 2012    (TW) .............................. 101145879 A

(51) Int. Cl.
*G06F 1/16* (2006.01)
*G06F 3/0354* (2013.01)

(52) U.S. Cl.
CPC .............. *G06F 1/16* (2013.01); *G06F 3/03543* (2013.01); *G06F 3/03544* (2013.01); *G06F 2203/0338* (2013.01)

(58) Field of Classification Search
CPC ...... G06F 3/03543; G06F 3/0354; G06F 1/16
USPC ......................................................... 345/163
See application file for complete search history.

(56) References Cited

U.S. PATENT DOCUMENTS

| | | | | |
|---|---|---|---|---|
| 4,404,865 | A * | 9/1983 | Kim .......................... | 74/471 XY |
| 7,300,026 | B2 * | 11/2007 | Pap .............................. | 248/118 |
| 2006/0227108 | A1 * | 10/2006 | Meyer et al. .................. | 345/163 |
| 2008/0136777 | A1 * | 6/2008 | Lu et al. ......................... | 345/163 |
| 2011/0141017 | A1 * | 6/2011 | Ku .................................. | 345/163 |
| 2011/0221676 | A1 * | 9/2011 | Liu ............................... | 345/166 |
| 2012/0293414 | A1 * | 11/2012 | Wang et al. .................... | 345/163 |

* cited by examiner

*Primary Examiner* — Chanh Nguyen
*Assistant Examiner* — Daniel Duong
(74) *Attorney, Agent, or Firm* — Winston Hsu; Scott Margo

(57) ABSTRACT

A portable interactive electronic apparatus includes a shell and a touch control panel having a cover plate. The cover plate includes a first surface area and a second surface area, and the touch control panel is positioned on the shell. The first surface area is utilized for sensing a touch of a user's finger, and the second surface area is utilized for leading liquid components out from the cover plate.

8 Claims, 6 Drawing Sheets

PORTABLE INTERACTIVE ELECTRONIC APPARATUS

CROSS-REFERENCE TO RELATED APPLICATIONS

This application claims the benefit of Taiwan Patent Application No. 101145879 filed Dec. 6, 2012, now Taiwan Patent No. I460634, and incorporated herein by reference in its entirety.

BACKGROUND OF THE INVENTION

1. Field of the Invention

The present invention relates to an interactive touch control mechanism, and more particularly, to a portable interactive apparatus capable of leading liquid components out from a cover plate of a touch control panel of the interactive apparatus.

2. Description of the Prior Art

At present, a covenantal optical finger mouse (OFM) has a touch control panel positioned thereon to allow a user to execute operations of touch control. The touch control panel may not only detect a touch of the user's finger, but also may detect the fingerprint of the user. In the light of the detection of fingerprint, generally, the touch control panel could detect a clear fingerprint of the user. However, when the user's finger is moistened with water or by another liquid, or the user's finger has excessive sweat, the water, liquid, or sweat would result in the variations of refractive index, such that the images of the fingerprint detected by the touch control panel become more blurred or that the number of the images of the fingerprint could be detected by the touch control panel is decreased. Accordingly, the sensing efficiency of the touch control panel becomes poor.

SUMMARY OF THE INVENTION

It is therefore an objective of the present invention to provide a portable interactive electronic apparatus capable of leading liquid components out from the touch control panel so as to solve the foresaid problem in the prior art.

According to an embodiment of the present invention, a portable interactive electronic apparatus is disclosed. The portable interactive electronic apparatus comprises a shell and a touch control panel having a cover plate. The cover plate comprises a first surface area and a second surface area. The touch control panel is positioned on the shell. The first surface area is utilized for sensing a touch of a user's finger, and the second surface area is utilized for leading liquid components out from the cover plate.

In an embodiment of the present invention, the second surface area comprises micro drains formed by etching scratches for leading the liquid components out from the cover plate by capillarity or gravity. Therefore, even though the user's finger is moistened with water or by other liquid, or the user's finger has excessive sweat, the liquid components would be quickly lead out from the cover plate of the touch control panel, such that the touch control panel could detect a clear image of a fingerprint and has better sensing efficiency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
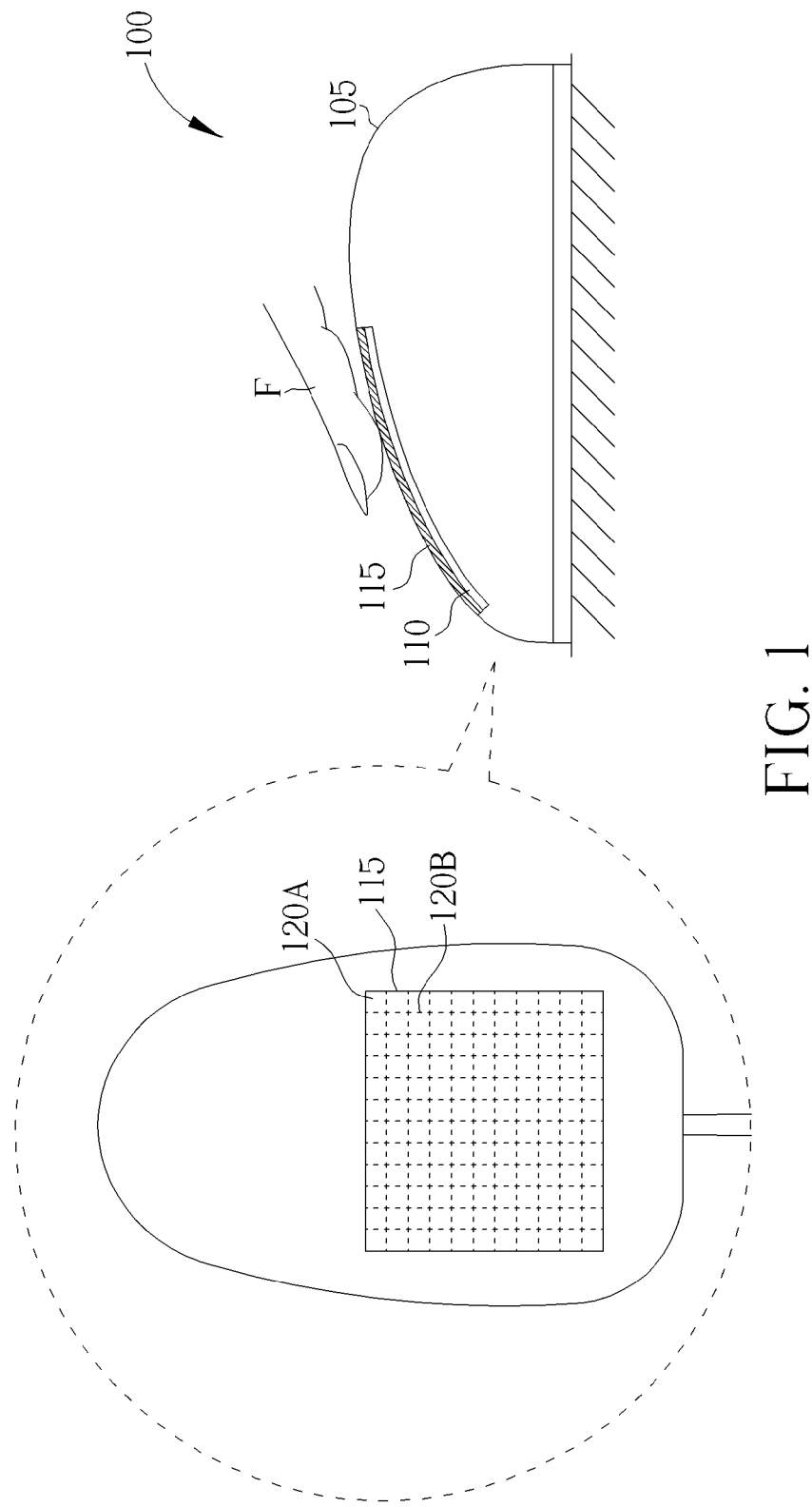
FIG. 1 is a schematic diagram of a portable interactive electronic apparatus according to an embodiment of the present invention.

Please refer to FIG. 1. FIG. 1 is a schematic diagram of a portable interactive electronic apparatus 100 according to an embodiment of the present invention. As shown in FIG. 1, the interactive electronic apparatus 100 has a shell 105 and a touch control panel 110. The touch control panel 110 is positioned on the shell 105 and has a cover plate 115. The cover plate 115 has a first surface area 120A and a second surface area 120B (designated by dotted lines). The first surface area 120A is utilized for sensing a touch of a user's finger F, and the second surface area 120B is utilized for leading liquid components (including water drop, sweat, or other liquid) out from the cover plate 115.

In an embodiment of the present invention, the interactive electronic apparatus 100 could be, for example, an optical finger mouse. The shell 105 is a housing of the optical finger mouse. The user could control the operations of the interactive electronic apparatus 100 by touching the touch control panel 110 via his/her finger F. In the embodiment, in order to lead out the liquid components, e.g. sweat etc., left while the user's finger touches the touch control panel 110 so as to avoid sensing deviation or sensed image blur caused by variations of refractive index, the second surface area 120B has a plurality of rectangular notches. The notches are micro drains. Two ends of each of the notches are extended to the rim of the cover plate 115. The function of the notches is to gather and lead the liquid components out. Further, the notches lead the liquid components out from the cover plate 115 by capillarity or gravity such that the liquid around the center of the cover plate 115 would be lead out from the cover plate 115 due to capillarity or gravity. Therefore, the sweat left by the user's finger could be decreased, and an objective to keep the operations of touch sensing or fingerprint sensing of the touch control panel 110 from the interference of the liquid components could be accomplished.

In an embodiment of the present invention, the notches are etching scratches having tiny widths. The notches are interlaced and evenly distributed on the first surface area 120A of the cover plate 115 as shown in FIG. 1. In other words, the notches of the second surface area 120B present a reticularly-distributed structure on the cover plate 115. Further, it should be noted that, in the light of longitudinally arranged or transversely arranged notches, the notches are distributed in parallel on the cover plate 115, and the intervals between two adjacent notches are substantially equal. However, the present invention is not limited thereto. Moreover, the number of the notches formed by etching scratches is not a limitation of the present invention. Practically, for the sake of cost, only one etching scratch could be used to form the notch of the second surface area 120B to enhance the operations of leading the liquid out from the cover plate 115. Relatively, a plurality of etching scratches could be used to form the notches of the second surface area 120B for more effectively leading out or extruding the liquid components from the cover plate 115.

Figure 2:
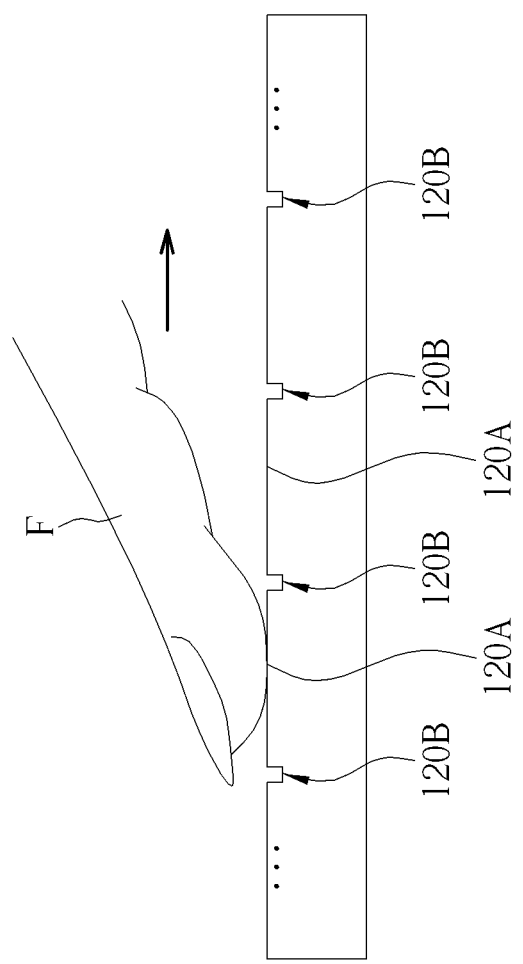
FIG. 2 is an exemplary cross-sectional diagram of the first surface area and the second surface area shown in FIG. 1.

Please refer to FIG. 2. FIG. 2 is an exemplary cross-sectional diagram of the first surface area 120A and the second surface area 120B. As shown in FIG. 2, it could be deemed that one of the first surface areas 120A is located between two of the etching scratches (i.e. the notches of the second surface area 120B), and the height of the notches of the second surface area 120B is lower than the height of the first surface area 120A. When the user's finger F touches the first surface area 120A and slips from one first surface area 120A to another first surface area 120A, the liquid components (i.e. sweat etc.) generated by the user's finger F would be gathered by the notch of the second surface area 120B between the two first surface areas 120A, such that the result of sensing the touch of the user's finger F would not influenced by excessive sweat of the user's finger F. Moreover, even though the user's finger merely touches one of the first surface areas 120A to control the touched first surface area 120A, as long as the user's finger F slips, the liquid components left on the first surface area 120A would be driven into the notches of the second surface area 120B due to the slippage of the user's finger F. Relying on the behavior of the user, the etching scratches could effectively gather, lead out and extrude the liquid components from the first surface area 120A so as to keep the operations of touch sensing or fingerprint sensing of the first surface area 120A from interference by the excessive liquid components. Since the notches of the second surface areas 120B are capable of gathering and leading out the liquid components left on the first surface areas 120A or the liquid components generated by the user's finger F, the second surface areas 120B in the embodiment function as wipers to lead the moisture out from the touch control panel 110.

Moreover, in the embodiment, the micro drains of the etching scratches of the second surface areas 120B may be coated with an absorbent material, such that the efficiency of leading out or extruding the liquid components from the cover plate 115 could be improved with the help of the absorbent material to quickly gather the sweat of the user's finger F or the sweat left on the first surface areas 120A. The foresaid absorbent material could be any kind of absorbent material, and the present invention is not limited thereto. Moreover, in the implementations of the foresaid embodiments, the touch control panel 110 could be a capacitive touch control panel, a resistive touch control panel, or a backlight touch control panel.

Figure 3A:
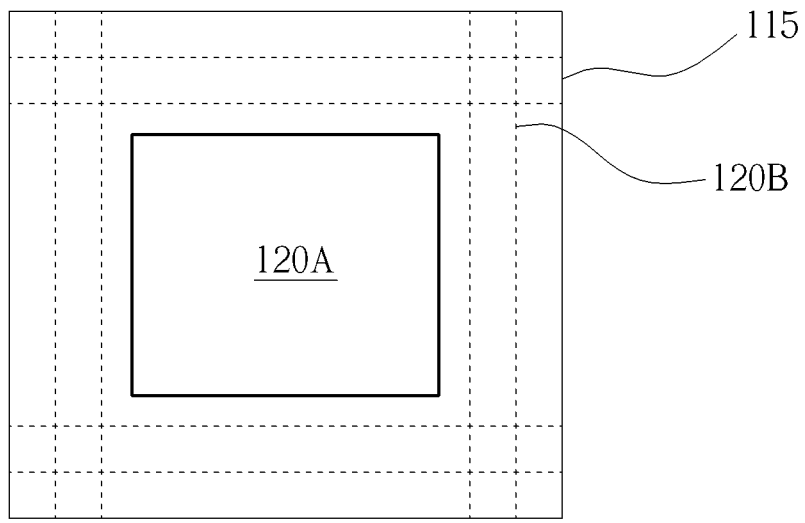
FIGS. 3A to 3H are exemplary schematic diagrams illustrating different kinds of designs of the micro drains of the etching scratches of the interactive electronic apparatus shown in FIG. 1.
Figure 3B:
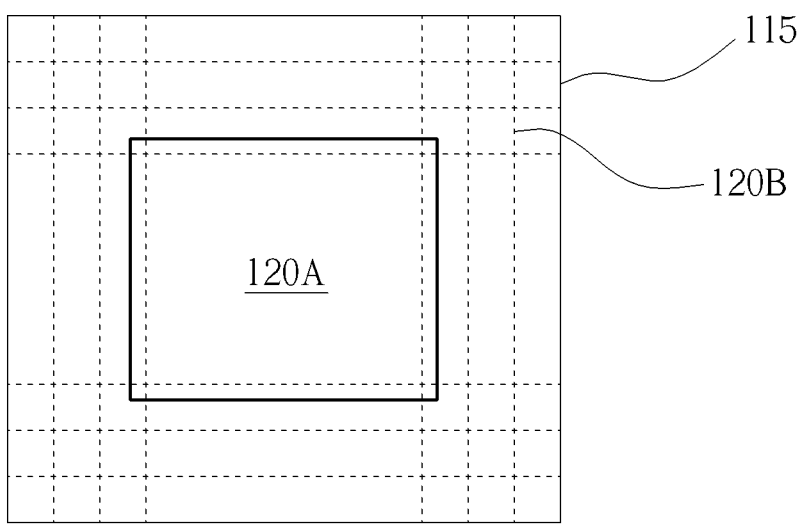

Further, the designs of the micro drains of the etching scratches in the present invention is not limited to that shown in FIG. 1 which illustrates that the second surface area 120B completely overlaps the first surface area 120A. In other embodiments of the present invention, other kinds of designs of the micro drains could be used to accomplish the operations of gathering and leading out the liquid components from the touch control panel. Please refer to FIGS. 3A to 3B. FIGS. 3A to 3B are exemplary schematic diagrams illustrating different kinds of designs of the micro drains of the etching scratches of the interactive electronic apparatus 100 shown in FIG. 1. As shown in FIG. 3A, the micro drains of the etching scratches of the second surface area 120B are distributed around the first surface area 120A (i.e. a sensing area) and do not overlap the first surface area 120A. In other words, the second surface area 120B is positioned on a non-sensing area. When the user's finger F slips over the touch control panel 110, the sweat or water droplet left on the first surface area 120A may be driven out from the center of the first surface area 120A. Therefore, the left sweat or water droplet could be gathered by the micro drains of the etching scratches distributed around the first surface area 120A. After being gathered by the micro drains, the sweat or the water droplet could be lead out by capillarity or gravity. Moreover, since the micro drains of the etching scratches of the second surface area 120B are distributed around the first surface area 120A, when the user's finger F slips from the non-sensing area into the sensing area, the area having the densely distributed micro drains of the etching scratches would be passed by firstly, such that the water drop or excessive sweat of the user's finger F would be lead out behind the sensing area, and that the operations of touch control or fingerprint detecting are kept from interference. In an embodiment of the present invention, the second surface area 120B could be designed to partly overlap the first surface area 120A. For example, as shown in FIG. 3B, a part of the micro drains of the etching scratches of the second surface area 120B is located on the first surface area 120A (i.e. the sensing area), and another part of the micro drains of the etching scratches of the second surface area 120B is located around the first surface area 120A. The second surface area 120B does not completely overlap the first surface area 120A, but partly overlaps the first surface area 120A. When the user's finger slips over the touch control panel 110, the sweat or water droplet left in the center of the first surface area 120A may be driven out, such that the sweat or water droplet could be gathered by the micro drains of the etching scratches located within the overlapped area of the two surface areas or by the micro drains of the etching scratches located around the first surface area 120A. After the sweat or water droplet is gathered, the sweat or water droplet could be lead out by capillarity or gravity.

Figure 3C:
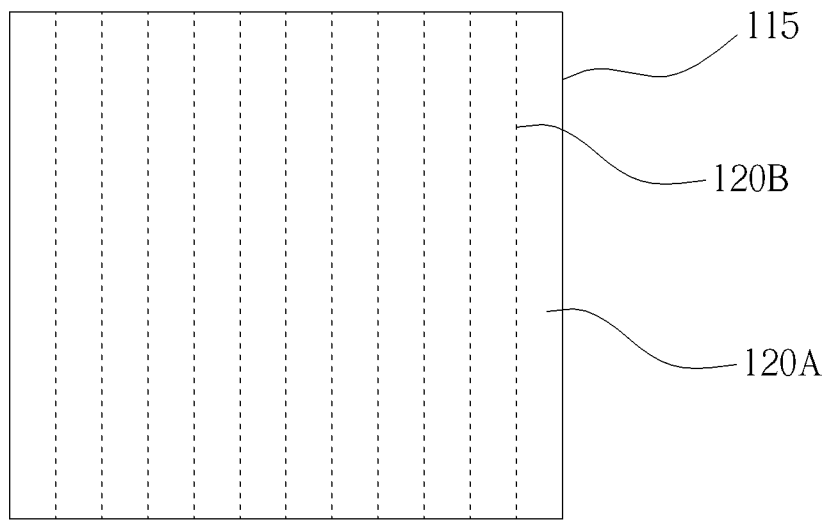
Figure 3D:
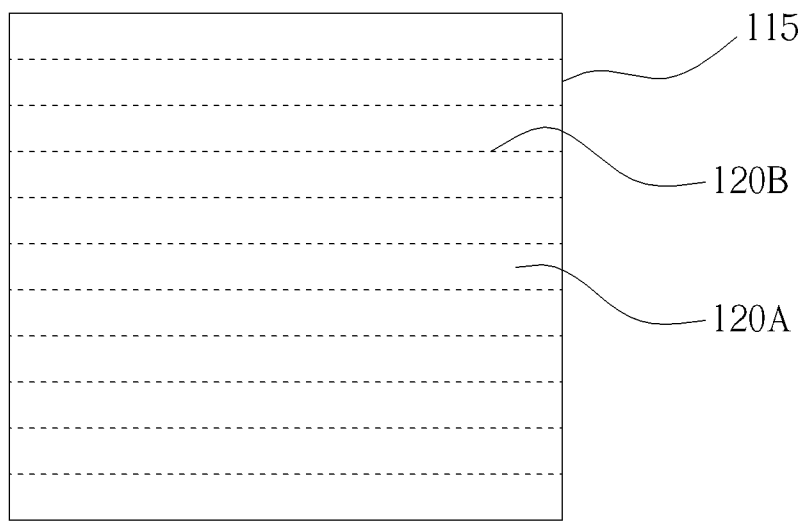
Figure 3E:
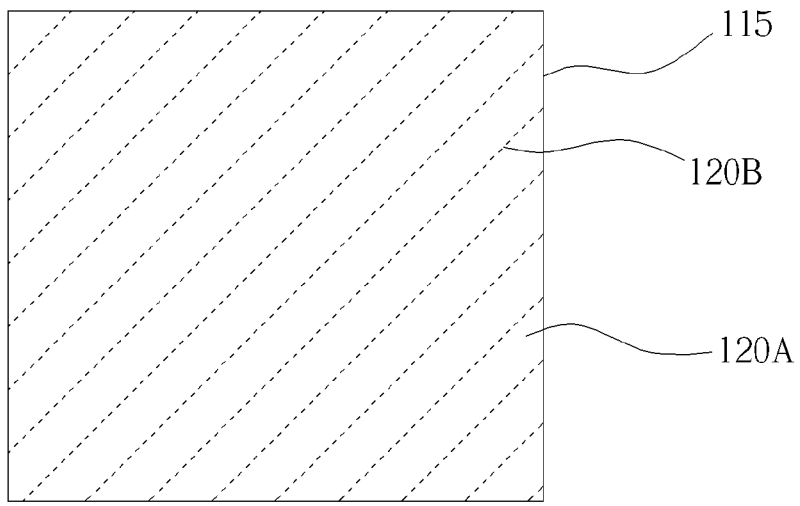
Figure 3F:
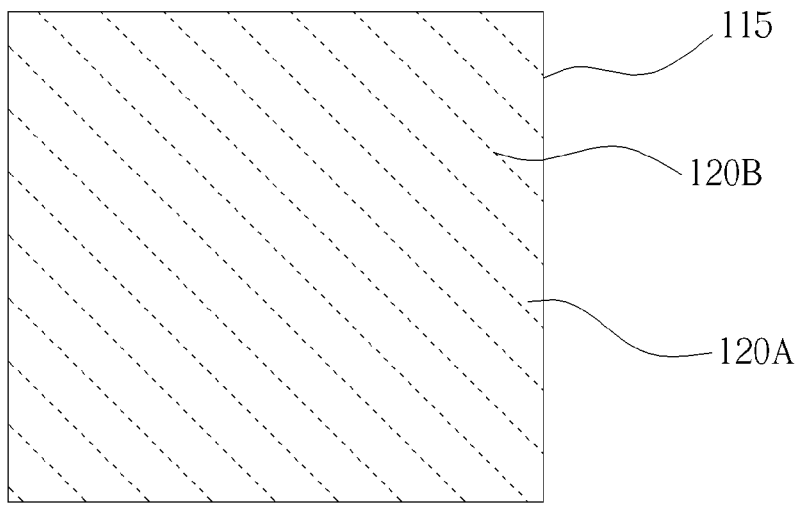
Figure 3G:
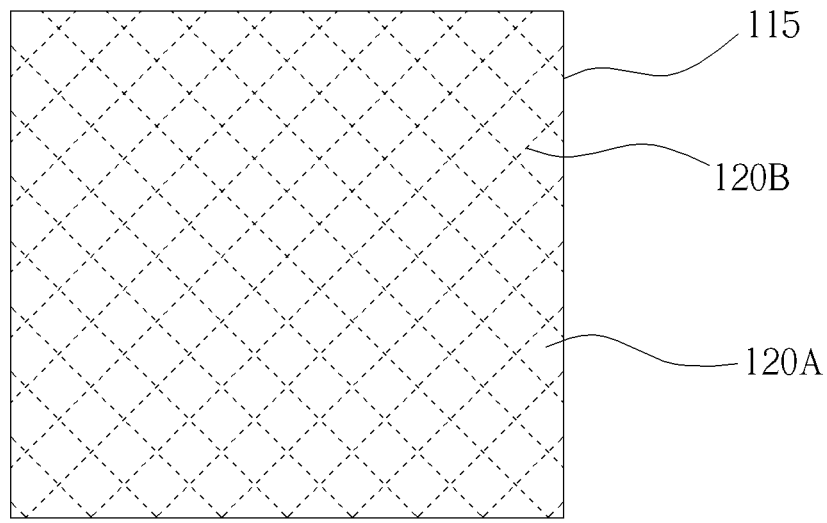
Figure 3H:
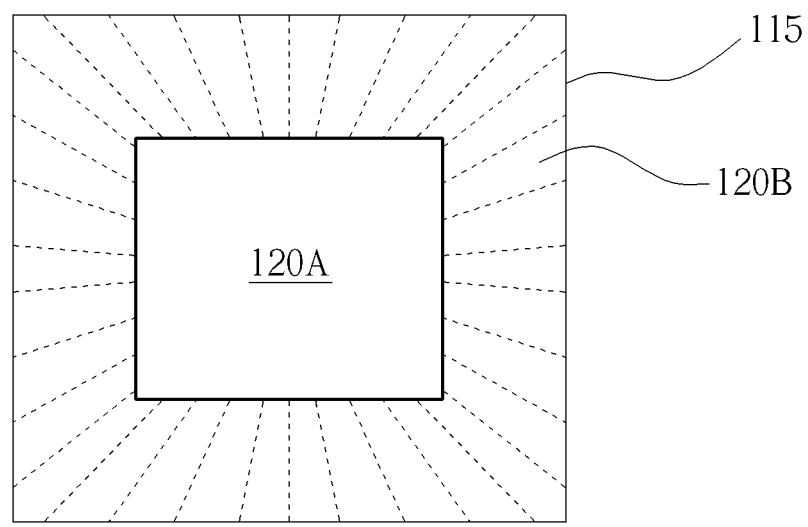

Moreover, the designs of the micro drains of the etching scratches in the present invention is not limited to that shown in FIG. 1 which illustrates that the micro drains are interlaced. In other embodiments of the present invention, other kinds of designs of the micro drains could be used to accomplish the operations of gathering and leading the liquid components out from the touch control panel. Please refer to FIGS. 3C to 3H. FIGS. 3C to 3H are exemplary schematic diagrams illustrating different kinds of designs of the micro drains of the etching scratches of the interactive electronic apparatus 100 shown in FIG. 1. As shown in FIG. 3C, the micro drains of the etching scratches of the second surface area 120B are longitudinally distributed in parallel (non-interlaced) on the first surface area 120A and overlap the first surface area 120A. As shown in FIG. 3D, the micro drains of the etching scratches of the second surface area 120B are transversely distributed in parallel (non-interlaced) on the first surface area 120A and overlap the first surface area 120A. Further, as shown in FIGS. 3E and 3F, the micro drains of the etching scratches of the second surface area 120B are obliquely distributed in parallel (non-interlaced) on the first surface area 120A with different oblique angles and overlap the first surface area 120A. Furthermore, as shown in FIG. 3G, the micro drains of the etching scratches of the second surface area 120B are interlaced, obliquely distributed on the first surface area 120A, and overlap the first surface area 120A. Moreover, as shown in FIG. 3H, the micro drains of the etching scratches of the second surface area 120B are distributed around the first surface area 120A (i.e. the sensing area) and do not overlap the first surface area 120A. The micro drains of the etching scratches are radially distributed on the non-sensing area. Each of the micro drains of the etching scratches does not interlace with other micro drains of the etching scratches. However, the present invention is not limited thereto.

In view of above-mentioned embodiments, the liquid components on the cover plate of the touch control panel could be lead out from the cover plate by capillarity or gravity through the micro drains formed by the etching scratches. Accordingly, even though the user's finger is moistened with water or by other liquid, or the user's finger has excessive sweat, the liquid components would be quickly lead out from the cover plate of the touch control panel, such that the touch control panel could be detect a clear image of a fingerprint and has better sensing efficiency. Moreover, the designs of the structures of the etching scratches could improve the comfort of the user when his/her finger touches the touch control panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable interactive electronic apparatus, comprising:
    a shell; and
    a touch control panel, positioned on the shell, the touch control panel having a cover plate, and the cover plate comprising:
        a first surface area at least partially covering the touch control panel, for sensing a touch of a user's finger; and
        a second surface area at least partially covering the touch control panel, the second surface area comprising a plurality of rectangular notches formed on the cover plate and cutting through the first surface area for leading liquid components out from the first surface area into the second surface area of the cover plate, wherein intervals between any two adjacent rectangular notches are substantially equal.

2. The interactive electronic apparatus of claim 1, wherein the plurality of rectangular notches are distributed in parallel on the cover plate.

3. The interactive electronic apparatus of claim 1, wherein the plurality of rectangular notches are interlaced and distributed on the cover plate.

4. The interactive electronic apparatus of claim 1, wherein the interactive electronic apparatus is an optical finger mouse (OFM).

5. The interactive electronic apparatus of claim 1, wherein the touch control panel is a capacitive touch control panel, a resistive touch control panel, or a backlight touch control panel.

6. The interactive electronic apparatus of claim 1, wherein a height of the second surface area is lower than a height of the first surface area.

7. The interactive electronic apparatus of claim 1, wherein the second surface area is coated with an absorbent material, and the liquid components is lead out from the cover plate through the absorbent material.

8. The interactive electronic apparatus of claim 1, wherein the first surface area partly or completely overlaps the second surface area.

* * * * *